US009857469B2

(12) United States Patent
Oggier et al.

(10) Patent No.: US 9,857,469 B2
(45) Date of Patent: Jan. 2, 2018

(54) SYSTEM AND METHOD FOR MULTI TOF CAMERA OPERATION USING PHASE HOPPING

(75) Inventors: Thierry Oggier, Zurich (CH); Bernhard Buettgen, Adliswil (CH); Matthias Schweizer, Lenzburg (CH)

(73) Assignee: Heptagon Micro Optics Pte. Ltd., Singapore (SG)

( * ) Notice: Subject to any disclaimer, the term of this patent is extended or adjusted under 35 U.S.C. 154(b) by 708 days.

(21) Appl. No.: 13/280,154

(22) Filed: Oct. 24, 2011

(65) Prior Publication Data

US 2012/0098964 A1    Apr. 26, 2012

Related U.S. Application Data

(60) Provisional application No. 61/405,859, filed on Oct. 22, 2010.

(51) Int. Cl.
| | |
|---|---|
| H04N 7/18 | (2006.01) |
| G01C 3/08 | (2006.01) |
| G06K 9/00 | (2006.01) |
| G01S 17/36 | (2006.01) |
| G01S 17/10 | (2006.01) |
| H04N 13/02 | (2006.01) |
| G01S 17/89 | (2006.01) |
| G01S 17/87 | (2006.01) |

(52) U.S. Cl.
CPC ............... *G01S 17/36* (2013.01); *G01S 17/10* (2013.01); *G01S 17/87* (2013.01); *G01S 17/89* (2013.01); *H04N 13/0203* (2013.01)

(58) Field of Classification Search
CPC ............ G01S 17/10; G01S 17/89; G01S 7/497
See application file for complete search history.

(56) References Cited

U.S. PATENT DOCUMENTS

| | | | | |
|---|---|---|---|---|
| 5,568,249 A | * | 10/1996 | Kawamura | G02B 7/32 250/201.8 |
| 7,095,487 B2 | * | 8/2006 | Gonzalez-Banos | G01C 3/08 356/3.13 |
| 7,274,815 B1 | * | 9/2007 | Smithpeter et al. | 382/154 |
| 7,405,812 B1 | * | 7/2008 | Bamji | 356/5.1 |
| 7,462,808 B2 | * | 12/2008 | Lustenberger et al. | 250/208.1 |
| 7,884,310 B2 | | 2/2011 | Buettgen | |
| 8,217,327 B2 | * | 7/2012 | Kim | G01S 7/483 250/208.1 |
| 8,482,722 B2 | * | 7/2013 | Min et al. | 356/5.1 |
| 8,629,976 B2 | * | 1/2014 | Hui et al. | 356/4.01 |

(Continued)

OTHER PUBLICATIONS

Büttgen, B.; Seitz, P. Robust optical Time-of-Flight range imaging based on smart pixel structures. Trans. Circ. Sys. 2008, 1, 1512-1525.*

Whyte, R. Z. et al., 'Multiple range imaging camera operation with minimal performance impact,' SPIE-IS&T, vol. 7538, 2010, pp. 75380I-01-75380I-10.

(Continued)

*Primary Examiner* — Joseph Ustaris
*Assistant Examiner* — Rebecca Volentine
(74) *Attorney, Agent, or Firm* — Fish & Richardson P.C.

(57) ABSTRACT

A modulation technique for 3D time-of-flight (TOF) cameras allows the operation of fully autonomous operated 3D TOF cameras. The method subdivides the exposure time into several sub-exposure intervals, for which the signal control unit adds a preferably pseudo-random common phase delay to the illumination and the sensor.

10 Claims, 3 Drawing Sheets

(56) References Cited

U.S. PATENT DOCUMENTS

| | | | |
|---|---|---|---|
| 2002/0084430 A1* | 7/2002 | Bamji | G01S 7/493 250/559.05 |
| 2005/0190206 A1 | 9/2005 | Lang et al. | |
| 2007/0182949 A1 | 8/2007 | Niclass | |
| 2008/0231832 A1* | 9/2008 | Sawachi | G01S 7/493 356/5.1 |
| 2008/0304039 A1* | 12/2008 | De Coi | 356/4.1 |
| 2009/0021617 A1* | 1/2009 | Oggier | G01S 17/89 348/294 |
| 2009/0059201 A1* | 3/2009 | Willner | G01S 7/491 356/5.01 |
| 2009/0079959 A1* | 3/2009 | Masuda | G01S 7/493 356/5.1 |
| 2011/0164132 A1* | 7/2011 | Buettgen et al. | 348/135 |
| 2011/0176709 A1* | 7/2011 | Park et al. | 382/106 |
| 2012/0314037 A1* | 12/2012 | Nehmadi et al. | 348/48 |

OTHER PUBLICATIONS

European Search Report, completed on Apr. 2, 2012, from European Application Application No. EP 11 18 9550.

Büttgen, Bernhard, "Extending Time-of-Flight Optical 3D-Imaging to Extreme Operating Conditions," Ph.D. Thesis, University of Nuechatel, 209 pages, 2006.

Büttgen, Bernhard et al, "Pseudo-noise Optical Modulation for Real-Time 3-D Imaging With Minimum Interference," IEEE transaction on circuits and systems, vol. 55, No. 6, pp. 2109-2119, Jul. 2008.

Oggier, Theirry et al., "An all-solid optical range camera for 3D real-time imaging with sub-centimeter depth resolution (SwissRangerTM)," Proc. of the SPIE, vol. 5249, pp. 534-545, 2004.

Payne, Andrew W. et al, "Improved linearity using harmonic error rejection in a full-field range imaging system," Proc. of SPIE, vol. 6805, pp. 68050D-1 to 68050D-11, 2008.

\* cited by examiner

SYSTEM AND METHOD FOR MULTI TOF CAMERA OPERATION USING PHASE HOPPING

RELATED APPLICATIONS

This application claims the benefit under 35 USC 119(e) of U.S. Provisional Application No. 61/405,859, filed on Oct. 22, 2010, which is incorporated herein by reference in its entirety.

BACKGROUND OF THE INVENTION

Three dimensional (3D) time-of-flight (TOF) cameras are active-type optical depth measurement imaging systems. In general, TOF cameras are based on the phase-measurement technique of emitted intensity-modulated light, which is reflected by the scene. The reflected light is imaged onto a sensor comprising a two-dimensional array of pixels. The photo-generated electrons are synchronously demodulated in the sensor, and based on the phase information, the distance for each pixel is deduced. A more detailed description is presented in U.S. Pat. No. 7,884,310, which is incorporated herein by this reference in its entirety.

A major problem of the state-of-the-art 3D TOF cameras is that cameras operating with the same modulation frequency interfere with each other. Different technologies are known to overcome this interference issue, however.

If more than one camera is operated, the cameras can be multiplexed in time (time-division multiplexing). In that case, the cameras a) need to be synchronized with one another and b) are slowed down in their individual frame rates.

Space-division multiplexing (SDMA) just separates the different cameras spatially, which is not an option for many applications.

Frequency multiplexing (FDMA) is another well-known method to avoid interference between cameras. Applying different modulation frequencies to the different cameras solves the problem of interference, but adds complexity in production and calibration and the cameras' resolution is different dependant on the applied modulation frequency.

The wavelength division multiplexing technique (WDMA) assigns a unique optical emission and detection wavelength to each camera. WDMA would restrict the number of cameras that can be used, however. It also increases challenges in manufacturing the different cameras.

Code division multiplexing (CDMA) is another common approach to avoid interference. By equally coding the emitted light and the receiver, the camera can unambiguously detect its own "light," and interference is generally reduced. However, practical implementation so far have shown that the power budget of cameras applying a CDMA modulation technique is always worse compared to the pure sine modulation. The theoretical derivation of a TOF camera using pseudo-noise modulation as well as the practical results have been presented in B. Büttgen et al, "Pseudo-noise Optical Modulation for Real-Time 3-D Imaging With Minimum Interference", IEEE transaction on circuits and systems, VOL. 55, NO. 6, July 2008.

All these possible modulation techniques and drawbacks are described in B. Büttgen, "Extending Time-of-Flight Optical 3D-Imaging to Extreme Operating Conditions", Ph.D. thesis, University of Neuchatel, 2006.

More recently, a method to reduce camera interferences was described in U.S. Pat. No. 7,405,812. The method proposes to vary the frequency during the exposure (frequency hopping), add temporarily imperfections (waveform, periodicity), and include clock noise. All those propositions promise good multi-camera operability but require either highly complex clocking circuitry or risk unstable behavior.

SUMMARY OF THE INVENTION

In general according to one aspect, the invention features a time of flight imaging system comprising multiple time of flight cameras imaging a scene in which different phase delays are applied in subexposures by each of the cameras.

In general according to one aspect, the invention features a time of flight imaging method comprising applying the same phase delay to a sensor and an illumination unit of a camera that is changed between subexposures.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
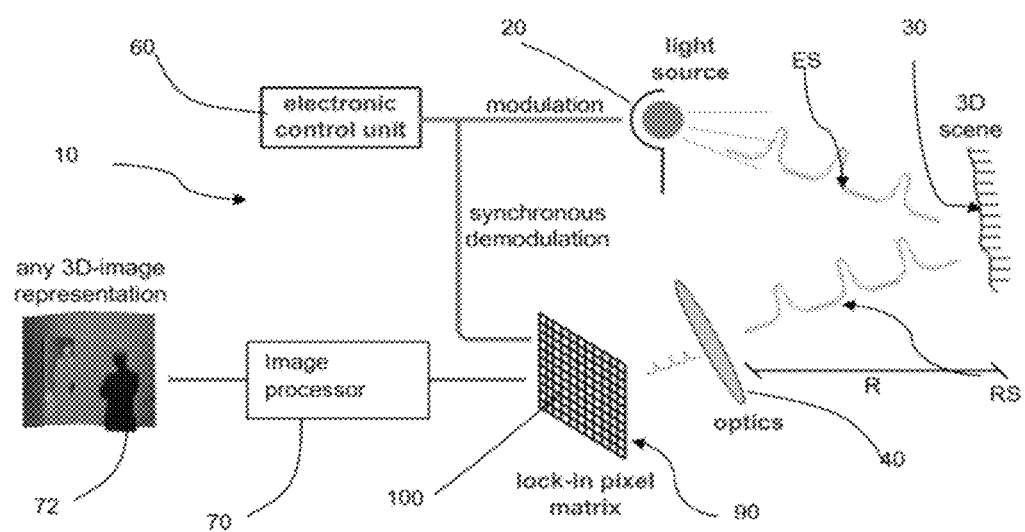
FIG. 1 is a schematic diagram illustrating the operation of a time-of-flight (TOF) camera and its operation.

FIG. 1 illustrates the basic principle of a 3D-measurement camera system 10 based on a sensor 90 comprising the two-dimensional array of demodulation pixels 100.

Modulated illumination light ES emitted from an illumination module or light source 20 of the camera 10 is sent to the object 30 of a scene. A fraction of the total optical power sent out is reflected (see reference RS) and received back at the camera 10, through the optics 40 and detected by the 3D imaging sensor 90.

The sensor 90 comprises a two dimensional pixel matrix of the demodulation pixels 100. Each pixel 100 is capable of demodulating the impinging light signal RS. An electronics control unit 60 controls the timing of the illumination 20 and sensor 90. The phase values of all pixels 100 correspond to the particular distance information of the corresponding point in the scene. The two-dimension gray scale image with the distance information is converted into a three-dimensional image 72 by image processor 70. This can be displayed to a user via a display or used as a machine vision input.

The distance R for each pixel 100 is calculated by:

$$R=(c*TOF)/2,$$

with c as light velocity and TOF corresponding to the time-of-flight. Intensity-modulated light is sent out by the illumination module or light source 20, reflected by the object 30 and detected by the sensor 90. With each pixel 100 of the sensor 90 being capable of demodulating the optical signal RS at the same time, the sensor 90 is able to deliver 3D images in real-time, i.e., frame rates of up to 30 Hertz (Hz), or even more, are possible. Continuous sine modulation delivers the phase delay (P) between the emitted signal ES and the received signal RS, which corresponds directly to the distance R:

$$R=(P*c)/(4*pi*fmod),$$

where fmod is the modulation frequency of the emitted optical signal ES. Typical state-of-the-art modulation frequencies range from a few MHz up to a few hundreds of MHz or even GHz.

Figure 2A:
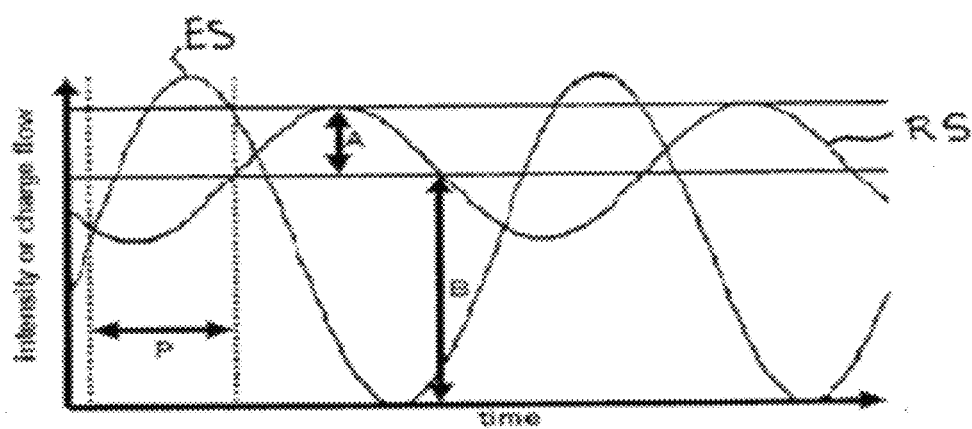
FIG. 2A is a plot of intensity as a function of time showing the emitted and received signals.
Figure 2B:
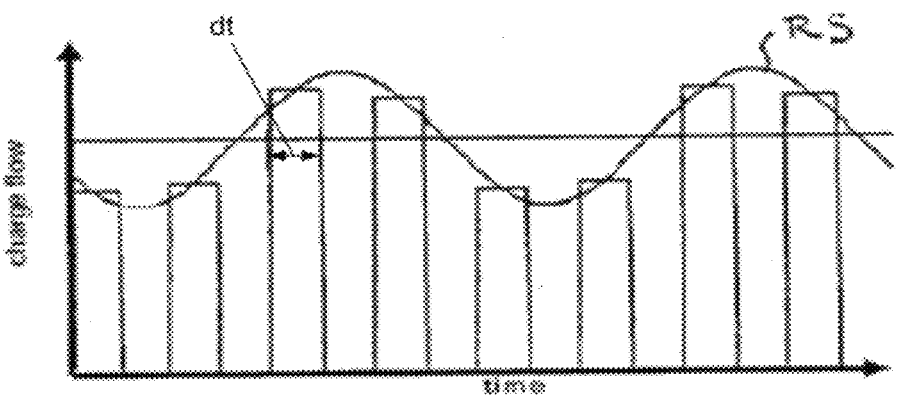
FIG. 2B is a plot of intensity showing the demodulation of the received signal.

FIGS. 2A and 2B show the relationship between signals for the case of continuous sinusoidal modulation and the signal sampling.

FIG. 2A shows both the modulated emitted illumination signal ES and received signal RS. The amplitude A, offset B of the received signal RS and phase P between both signals are unknown, but they can be unambiguously reconstructed with at least three samples of the received signal. B represents the received signal part due to background light.

In FIG. 2B shows a sampling with four samples per modulation period being depicted. Each sample is an integration of the electrical photo-signal in the integration gates or diffusion regions in each pixel 100 over a duration dt that is a predefined fraction of the modulation period. Typically, in demodulation pixels 100 with four integration sites, dt corresponds to a quarter of the period. In order to increase the signal to noise ratio of each sample the photo-generated charges may be accumulated over several—up to more than 1 million—modulation periods in the integration sites.

The electronic control unit 60, employing for example a field programmable gate array (FPGA), generates the signals for the synchronous channel activation in the demodulation stage.

Using these four samples, the three decisive modulation parameters amplitude A, offset B and phase shift P of the modulation signal can be extracted by the equations $$A=\text{sqrt}[(A3-A1)^2+(A2-A0)^2]/2$$

$$B=[A0+A1+A2+A3]/4$$

$$P=\arctan[(A3-A1)/(A0-A2)]$$

Figure 3:
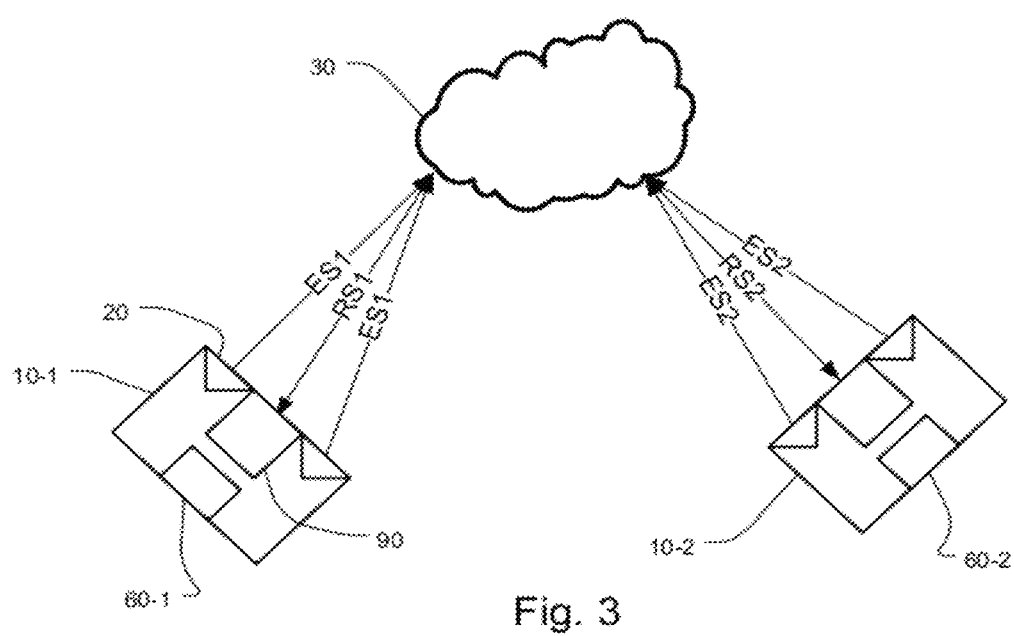
FIG. 3 is a schematic diagram illustrated multi camera operation.

FIG. 3 illustrates the application of the present invention. Here two cameras 10-1, 10-2 observe the same object or scene 30. Each camera has its own illumination unit 20 and sensor 90 that are controlled by separate electronics control units 60-1, 60-2.

Figure 4:
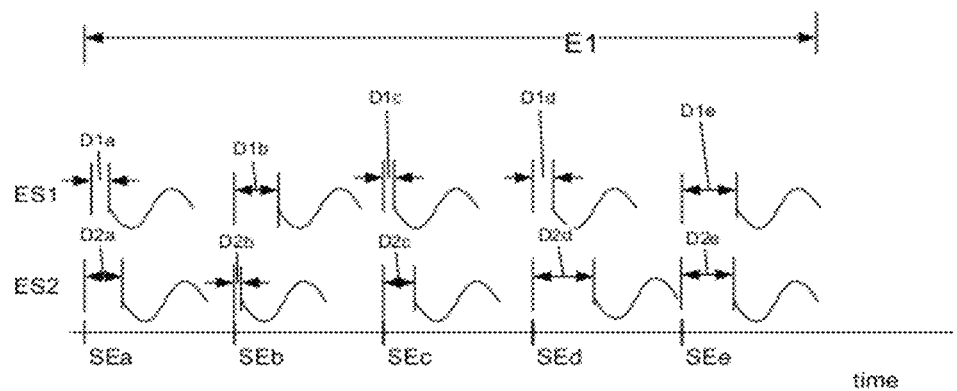
FIG. 4 is a timing diagram showing the exposure and delays provided in each subexposure according to the present invention.

As illustrated in FIG. 4, each camera 10-1, 10-2 operates by subdividing its exposures E into several sub-exposures SEa-SEe. For each of the sub-exposures SEa-SEe, the phase of the illumination 20 and the sensor 90 is changed by electronics control units 60-1, 60-2. A common phase delay D1, D2 is added to the illumination module 20 and the sensor 90 for each of the sub-exposures in the emitted signals ES1, ES2 for each of the cameras 10-1, 10-2. These phase delays D1, D2 are different for the different cameras 10-1, 10-2, however.

Since for each camera its sensor 90 and the illumination unit 20 receive the same phase delay change, the phase delay between the illumination and the sensor is kept constant during the exposure for each camera. On the other hand, the phase delay is different between the cameras in each of the subexposures SE. Usually, the electronics control units 60-1, 60-2 each compute the phase change independently of each other and generate the corresponding signals for their respective illumination unit 20 and the sensor 90.

The phase change is preferably computed in a random or pseudo-random way and is different for each camera 10-1, 10-2. Moreover, the cameras 10-1, 10-2 will typically be unsynchronized as to their respective exposure and subexposure timing.

For the ease of implementation, a smaller set of possible phase delays might be applied, e.g. 0°, 90°, 180° and 270°, while the selection of the added phase delay is preferably random or pseudo-random.

Furthermore, to reduce impacts due to any camera mismatches, it is advantageous that a phase change of n° during a sub-exposure of duration t is followed by a sub-exposure with phase change of n°+180° with the same duration of t.

The sensors 90 preferably integrate over all sub-exposures SEa-SEe and only need to be read out after completing the full exposure.

To further reduce the probability of possible interference with other cameras, the duration of each sub-exposure might be varied in a random or pseudo-random way as well.

A possible extension of this "phase hopping" method is to combine it with the so-called harmonic cancellation as described in A. Payne et al., "Improved linearity using harmonic error rejection in a full-field range imaging system", Proc. SPIE Vol. 6805 and therefore not only improve multi-user operability but also reduce effects due to the harmonics.

While this invention has been particularly shown and described with references to preferred embodiments thereof, it will be understood by those skilled in the art that various changes in form and details may be made therein without departing from the scope of the invention encompassed by the appended claims.

What is claimed is:

1. A time of flight imaging system comprising:
multiple time of flight (TOF) cameras to image a scene, wherein each of the TOF cameras includes a respective illumination unit and sensor;
wherein each of the TOF cameras images the scene by integrating subexposures into corresponding exposures of the scene;
wherein each of the TOF cameras applies different randomly or pseudo-randomly determined phase delays to the subexposures that are integrated into the exposures such that a sequence of phase delays applied to the subexposures differs from one TOF camera to another TOF camera, wherein, for each particular one of the TOF cameras, its sensor and illumination unit receive a same phase delay change each time a different phase delay is to be applied; and
wherein the exposure of each particular camera is read out from a sensor in the camera only after integrating the corresponding subexposures.

2. A system as claimed in claim 1, wherein the TOF cameras are not synchronized with each other.

3. A system as claimed in claim 1, wherein successive subexposures have a phase delay that varies by 180 degrees.

4. A system as claimed in claim 1, wherein a length of the subexposures is varied randomly or pseudo randomly.

5. A time of flight imaging method comprising:
  applying phase delays to a respective sensor and illumination unit of each of multiple time of flight (TOF) cameras imaging a common scene;
  changing the phase delay between subexposures for each of the cameras such that a sequence of phase delays applied to the subexposures differs from one TOF camera to another TOF camera, the phase delays being randomly or pseudo-randomly determined, wherein, for each particular one of the TOF cameras, its sensor and illumination unit receive a same phase delay change each time a different phase delay is to be applied;
  integrating the subexposures for each respective one of the TOF cameras into a corresponding exposure of the scene; and
  subsequently reading out, from the sensor of each particular camera, the exposure, wherein the exposure of a particular sensor is read out from the sensor only after integrating the corresponding subexposures.

6. A method as claimed in claim 5, wherein the TOF cameras are not synchronized with each other.

7. A method as claimed in claim 5, wherein successive subexposures have a phase delay that varies by 180 degrees.

8. A method as claimed in claim 5, further comprising varying lengths of subexposures randomly or pseudo randomly.

9. The method as claimed in claim 5, wherein for each particular one of the cameras, the phase delay between the illumination unit and the imaging sensor of that camera remains constant throughout an exposure.

10. The method as claimed in claim 5, wherein signals from each particular sensor are read out from that sensor only after completing a full exposure.

* * * * *